United States Patent
Urvoy et al.

(10) Patent No.: US 7,603,221 B2
(45) Date of Patent: Oct. 13, 2009

(54) SLOWING DOWN PROCESS FOR A VEHICLE TAKING A BEND

(75) Inventors: Emile Urvoy, Limours (FR); Olivier Pape, Le Pecq (FR); Stephane Leveque, Plaisir (FR)

(73) Assignee: Nexter Systems, Roanne (FR)

( * ) Notice: Subject to any disclaimer, the term of this patent is extended or adjusted under 35 U.S.C. 154(b) by 804 days.

(21) Appl. No.: 10/545,299

(22) PCT Filed: Feb. 11, 2003

(86) PCT No.: PCT/FR03/00436

§ 371 (c)(1),
(2), (4) Date: Aug. 11, 2005

(87) PCT Pub. No.: WO2004/080782

PCT Pub. Date: Sep. 23, 2004

(65) Prior Publication Data

US 2006/0195247 A1    Aug. 31, 2006

(30) Foreign Application Priority Data

Feb. 4, 2002    (FR) .................................. 02 01253

(51) Int. Cl.
*B60T 8/32*    (2006.01)

(52) U.S. Cl. .............................. 701/93; 701/65; 701/70; 701/72; 701/74; 701/94; 180/6.28; 180/6.5; 180/9.1; 180/167; 180/168; 104/60; 104/295; 104/296; 104/305; 105/199.1; 105/199.2; 105/167; 105/168; 105/453; 477/62; 477/73; 477/74; 477/94; 477/120; 280/124.103; 280/5.502; 280/5.506; 280/5.508; 280/5.521

(58) Field of Classification Search ................... 701/93, 701/1, 22, 26, 41, 65, 70, 72, 74, 94; 180/6.28, 180/6.5, 9.1, 167, 168, 175, 216, 271, 275, 180/277, 402, 415, 422, 446, 907; 73/510, 73/514.02; 248/278.1; 104/60, 295, 296, 104/305; 60/347, 349, 354, 364, 404, 405, 60/406; 475/50, 220; 280/124.103, 5.502, 280/5.506, 5.508, 5.521, 802; 303/113, 140, 303/146, 139, 172; 702/96, 148; 105/199.1, 105/199.2, 167, 168, 453; 192/31, 35, 48.3, 192/58.42, 82 T; 318/587; 477/62, 73, 74, 477/94, 120, 141, 155, 158; 901/1, 48; 74/416, 74/411, 473.21; 152/209.19, 209.22, 209.28
See application file for complete search history.

(56) References Cited

U.S. PATENT DOCUMENTS 3,668,629 A * 6/1972 Pawl ........................... 340/453

(Continued)

FOREIGN PATENT DOCUMENTS

EP    0 448 059 A2    9/1991

(Continued)

*Primary Examiner*—Khoi Tran
*Assistant Examiner*—McDieunel Marc
(74) *Attorney, Agent, or Firm*—Oliff & Berridge, PLC

(57) ABSTRACT

An automatic slowing down system for a vehicle taking a bend includes a computer that integrates a series of instructions to process at least one of first, second and third signals according to kinematic control laws of vehicle displacement to deliver signals for a forward motion actuator and a steering actuator, a forward control and a steering control that supply the first signal representative of a forward motion data and a steering data to the computer based on an operator's requirement, a linear speed sensor and a yaw speed sensor that supply the second signal to the computer, and a unit that supplies the third signal relating to road grip to the computer.

20 Claims, 2 Drawing Sheets

U.S. PATENT DOCUMENTS

| | | | |
|---|---|---|---|
| 4,623,966 A * | 11/1986 | O'Sullivan | 701/301 |
| 4,961,145 A * | 10/1990 | Gernot | 701/76 |
| 5,307,888 A | 5/1994 | Urvoy | |
| 5,315,295 A | 5/1994 | Fujii | |
| 5,736,923 A * | 4/1998 | Saab | 340/429 |
| 5,980,411 A * | 11/1999 | Wontner | 475/76 |
| 6,141,613 A | 10/2000 | Fan | |
| 6,370,467 B1 * | 4/2002 | Kimbrough | 701/71 |
| 2004/0027076 A1 * | 2/2004 | Shimizu | 318/55 |
| 2007/0228703 A1 * | 10/2007 | Breed | 280/735 |

FOREIGN PATENT DOCUMENTS

| | | |
|---|---|---|
| EP | 0 788 922 A2 | 8/1997 |
| FR | 2 681 449 A1 | 3/1993 |
| WO | WO 01/56849 A1 | 8/2001 |

* cited by examiner

SLOWING DOWN PROCESS FOR A VEHICLE TAKING A BEND

This application is the National Stage of PCT/FR2003/000436, filed Feb. 11, 2003, which claims priority from French Patent Application No. 02-01253, filed Feb. 4, 2002, the disclosures of which are incorporated herein in their entireties by reference thereto.

BACKGROUND

The technical scope of the current disclosure is that of vehicle braking automatic control and processes.

A process is known by patent FR-2681449 to control the turning behaviour of a vehicle travelling at a certain speed, be it a tracked or wheeled vehicle, to ensure the stability of the turning vehicle and avoid oversteering or skidding.

According to this process, rounding a bend is performed safely, but the speed of the vehicle turning is not automatically taken into account, which is an associated and complementary issue, but one different to the problem posed in the invention.

Patent FR-A-2742888 describes another driving assistance process for a motor vehicle travelling on a track or road, able to superimpose a first image representative of the track seen by the operator and a second image representative of the set trajectory which the vehicle must follow to reach a future point of passage on the track selected by the operator, the image of the set trajectory being limited to the minimal safe stopping distance on this trajectory at its current speed.

For this, said set trajectory is prolonged beyond said stopping distance and for the current speed of the vehicle, by at least a first visual piece of data representative of the maximal turning possibilities permitted for an on-going or up-coming bend so as to allow the operator to visually estimate the correlation between the actual curve of the on-going or upcoming bend and the maximal Possibilities permitted to take this bend.

This process thus allows the bend to be anticipated and it is the operator who must adapt his speed to the bend.

More particularly, on unstructured ground, the driver does not know how to estimate the speed necessary to take the bend. This error in estimation may jeopardize the vehicle and its occupants.

SUMMARY

The aim of the current disclosure is to supply a system and process of implementing the automatic control of the slowing down of a vehicle enabling the driver to approximately estimate the speed necessary to take a bend without jeopardizing the vehicle and its occupants during the turn.

An exemplary embodiment thus relates to an automatic slowing down system for a vehicle taking a bend, including a computer that integrates a series of instructions to process at least one of first, second and third signals according to kinematic control laws of vehicle displacement to deliver signals for a forward motion actuator and a steering actuator, a forward control and a steering control that supply the first signal representative of a forward motion data and a steering data to the computer based on an operator's requirement, a linear speed sensor and a yaw speed sensor that supply the second signal to the computer, and a unit that supplies the third signal relating to road grip to the computer.

Another exemplary embodiment relates to an automatic slowing down method for a vehicle taking a bend, including measuring forward motion V and yaw speed $\Omega$ of said vehicle, determining forward motion data and steering data required by an operator based on the forward motion V and the yaw speed $\Omega$ of said vehicle to infer a first working point, determining kinematic laws of the vehicle to infer a second working point, and according to the difference between the first and second working points, controlling a forward motion actuator and a steering actuator of said vehicle.

Advantageously, data related to the road grip ($\mu$) is to be introduced.

Advantageously again, the speed compatible (VC) with the bend is determined and compared with the current speed (V) of the vehicle to saturate the forward motion speed control and slow down the vehicle according to the difference between the set working point and the working point according to the kinematic laws.

Advantageously again, the speed control is saturated by means of the vehicle injection computer or by means of the braking circuit pressure.

By way of a variant, the speed control is saturated by means of the vehicle's torque control.

According to one embodiment of the process, the control displayed by the operator is constantly compared to that imposed by the computer to bring the measured value back to that supplied by the computer.

According to another embodiment of the process, a deceleration strategy is defined that adapts the vehicle's speed on rounding a bend to that desired by the driver to establish iso-settings corresponding to low speed turn control, yaw speed control for moderate speeds and lateral acceleration control for high speeds.

Advantageously, the vehicle's kinematics is integrated to make it safe by avoiding skidding and the driver's loss of control.

An advantage of the process lies in the fact that the vehicle is automatically slowed down according to the steering command given by the operator.

Another advantage lies in the fact that the operator's commands are limited in the zone of operation respecting the vehicle's kinematic laws thus allowing the automatic control to take over the vehicle.

BRIEF DESCRIPTION OF THE DRAWINGS

Other characteristics, particulars and advantages of the invention will become apparent from the following description, given by way of illustration in reference to the drawings, in which.

DETAILED DESCRIPTION OF EMBODIMENTS

By kinematic control laws for vehicle displacement, we mean a set of ellipses calculated in a setting defined by the longitudinal and lateral accelerations as a function of road grip.

By nominal working point, we mean the point on the ellipse defined by a safety margin with respect to the ellipse obtained by kinematic control laws.

A vehicle in movement is considered to be at a speed V on a path, structured or not, that is, whose bends are known and modelled in the computer's memory. This arrangement may be carried out, for example, by incorporating a map into the computer memory linked to a GPS system. The vehicle driver at a distance from or in the vehicle commands a turn by means of a steering control. The invention is thus materialised by a series of functions integrated into the automatic implementation of the process.

Figure 1:
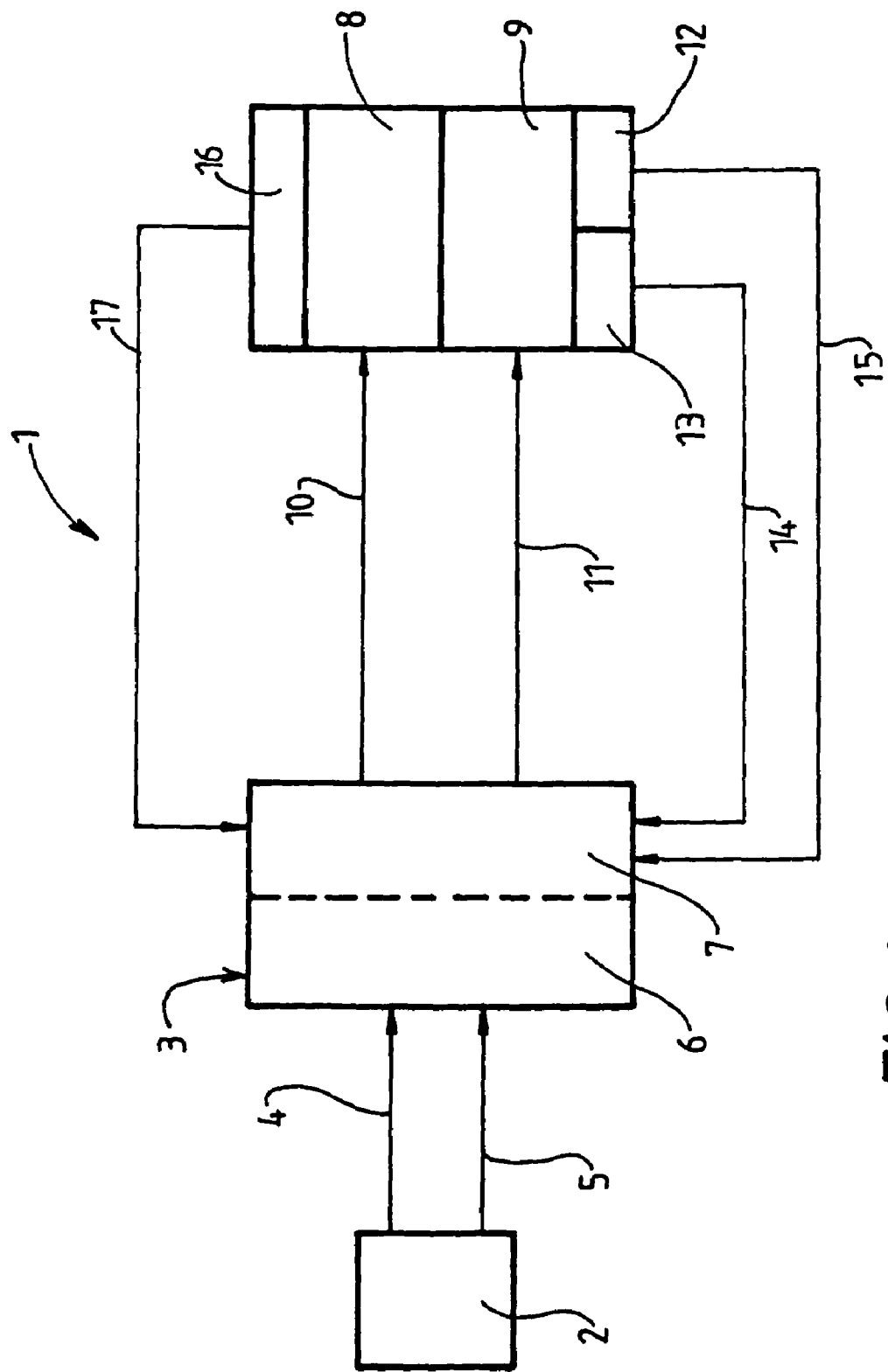
FIG. 1 shows the system to slow down a vehicle rounding a bend.

FIG. 1 shows a vehicle 1 integrating the system according to the invention in which the operator 2 is either present in the vehicle or is equipped with a remote control and is able to act via a computer 3. The operator 2 has a forward control 4 and a steering control 5 to pilot the vehicle 1. The data generated by these controls is sent to the computer which incorporates a certain number of mathematical algorithms ensuring the servo control means 6 and the saturation and commutation means 7. On the vehicle itself there is a forward motion actuator 8 and a steering actuator 9 controlled by respective links 10 and 11 by the computer so as to modify the vehicle's behaviour, as will be explained hereafter. Via links 14 and 15, a set of sensors 12 and 13 supplies the computer 3 with electrical signals representative of the vehicle's linear speed V (or axial) and its yaw (or radial) speed $\Omega$. Lastly, a unit 16 will determine the vehicle's road grip $\mu$ and will deliver a signal to the computer 3 via line 17.

The forward motion actuator 8 is understood to control the injection of a thermal engine by means of a suitable module (not shown) to accelerate the vehicle and the braking circuit pressure to brake the vehicle. If the vehicle has electric transmission, the module will act on the electric current control. The steering actuator 9 will act on a pump of the hydraulic steering unit in the case of a tracked vehicle or on the steering column in the case of a steering wheeled vehicle. Sensor 12, of a known type, is mainly intended to measure the linear speed of the vehicle, for example by measuring the mean speed of rotation of the vehicle's wheels or by using Doppler-effect radar. Sensor 13 is intended to measure the yaw speed, for example using a gyrometric sensor or using the steering control.

Based on the electric signals delivered, the computer 3 will openly intervene in place of the operator as soon as the vehicle exits the safety zone previously defined.

Firstly, an estimation is made of the speed VC compatible with the bend using sensor 12 and taking into account the kinematic properties of the vehicle incorporated into the memory of the computer 3, the road grip $\mu$ of the vehicle supplied by the unit as supposed by the operator or computed, the steering command given by the operator and the current speed V of the vehicle. This estimation allows the maximal acceptable speed to be fixed for the vehicle inside the safety zone. To avoid jeopardizing the vehicle, the saturation is ordered of the operator's forward control 10 and the steering control 11. Saturating the forward control is used in any event to slow down the vehicle at will when required. This deceleration imposed by the control process is defined as a function of the vehicle speed V, the speed VC compatible with the bend, the road grip $\mu$ estimated by the operator or computed, as explained previously, and of a parameter identified from the kinematic properties of the vehicle, that is, the optimal acceptable aperture ratio $\lambda$ for the bend. This saturation is applied by forcing the operator control and acting either on the injection computer via an adaptation module if the vehicle is equipped with a thermal engine, or on the brake control, or via a torque control if the vehicle is equipped with an electric motor.

By way of a variant, according to the invention, the automatic control may be activated when the yaw speed $\Omega$ of the vehicle, the road grip $\mu$ supposed by the operator or computed, and the current speed V no longer follow the kinematic laws of the vehicle.

The automatic control computer thus commands the vehicle's deceleration according to the difference between the working point required by the operator, that is to say the steering command and speed V of the vehicle, and the working point respecting the vehicle's kinematic laws.

Figure 2:
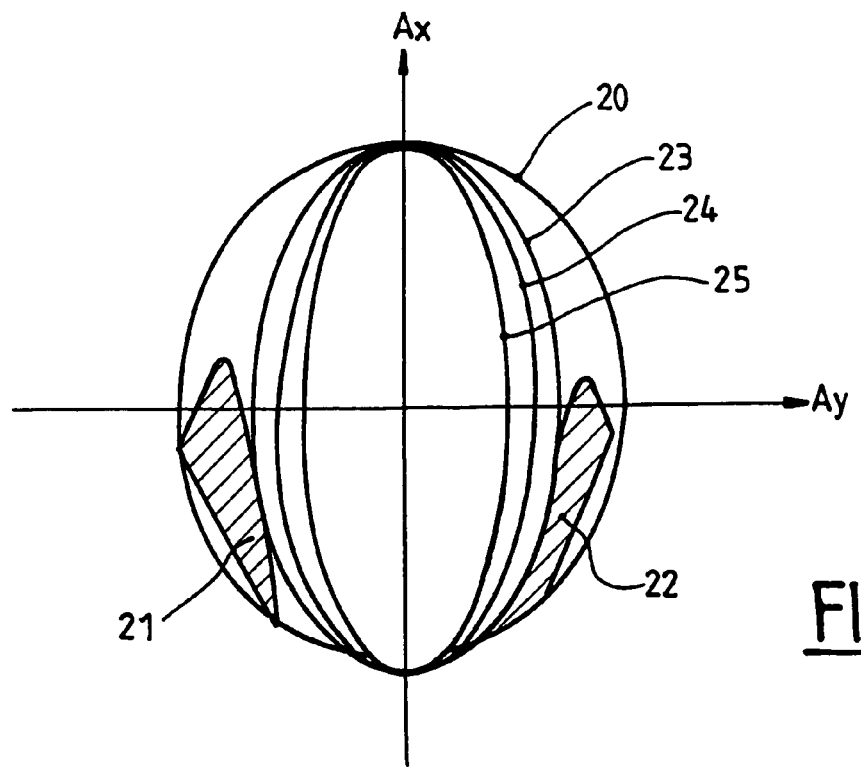
FIG. 2 shows all the zones in which the vehicle may be located.

FIG. 2 shows in an orthonormed x-axis reference the lateral acceleration Ay and in the y-axis the longitudinal acceleration Ax. The circle 20 of radius $\mu$G representative of the vehicle's physical road grip limitations is defined. Inside this circle, zones 21 and 22 represent zones of instability in which the vehicle is uncontrollable. A first ellipse 23 represents the safety limit which the vehicle must never exceed. This ellipse is defined as a function of the kinematic laws of the behaviour of the vehicle when rounding a bend. A second ellipse 24, with a smaller radius to that of ellipse 23, represents the turn aperture allowed for the vehicle in question. Generally speaking, this ellipse 24 is a function of the aperture ratio at the bend. A third ellipse 25, with a smaller radius to that of ellipse 24, represents the vehicle's nominal working range. The vehicle's kinematics is integrated in a form of ellipse in a plane of the longitudinal acceleration Ax/the lateral acceleration Ay, with which the working points are compared.

Supposing that the operator gives a command leading the vehicle to be outside circle 20 or ellipses 23 and 24, the process according to the invention allowing the operators steering control 11 to be restrained according to the forward speed so as to slow the vehicle down. This slowing down allows the vehicle 1 to be brought back into the zone defined by ellipse 25.

If the vehicle is merely outside ellipse 24, the operator's steering control 11 remains free but a-braking control 4 is applied so as to slow the vehicle down and bring it back into the nominal working range as defined by ellipse 25.

If the vehicle is within the zone defined by ellipse 25 the operator remains free to steer his vehicle.

A working point inside the ellipse 25 permits a transmission of forward motion data and steering data to the actuators. A working point inside the ellipse 24 is corrected by a saturation of the forward motion data before transmission to the forward motion actuator. A working point inside the ellipse 23 is corrected by a saturation of the forward motion data and the steering data before transmission respectively to the forward motion and steering actuators.

Figure 3:
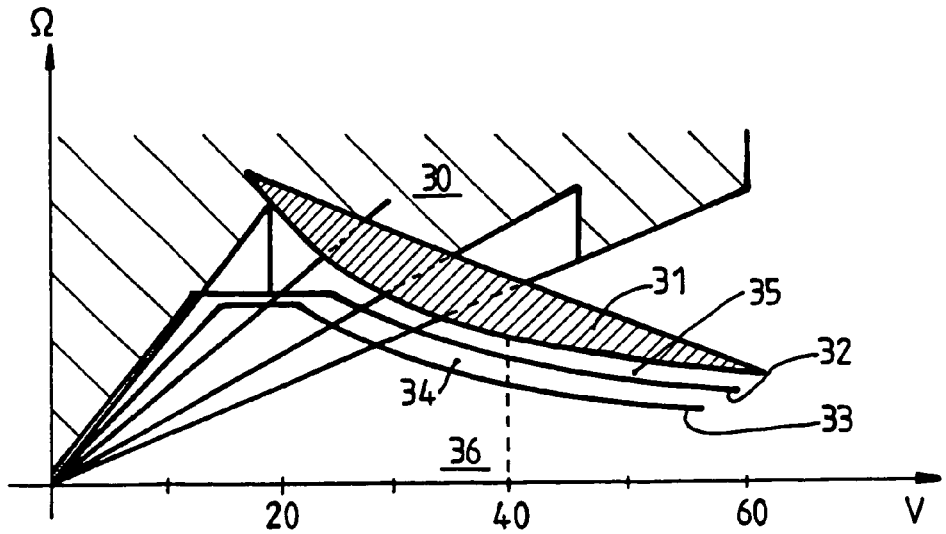
FIG. 3 shows an example of a sequence chart of the system.

FIG. 3 shows, for a tracked vehicle equipped with a hydraulic steering unit, the yaw speed $\Omega$ diagram for a vehicle as a function of its linear speed V defining for the automatic control the range for working, operator override and range preventing the vehicle from entering certain yaw speed ranges. First of all, a zone 30 is defined that constitutes a technologically inaccessible range for the vehicle, and a zone 31 that constitutes an unstable range for the vehicle, and this, for a linear speed of up to, for example, 60 km/h. Naturally, this speed depends on the vehicle in question. A curve 32 will be defined corresponding to the maximal displacement of the vehicle's steering control organ and representing the yaw speed as a function of the linear speed and the road grip with a margin of 60% of the theoretical yaw speed compatible with the road grip. A similar curve 33 will be defined corresponding to a margin of 50%. Zone 34 between curves 32 and 33 thus corresponds to a range of free steering control and automatic braking control allowing the vehicle to move away from the critical zone in around 2 seconds at a mean speed, for example, of less than 40 km/h. Zone 35, between zone 31 and curve 33 corresponds to a range as a function of the forward speed of the vehicle, beyond 40 km/h, in which steering control is free but the braking control is restricted with respect to the lateral acceleration of the vehicle. Zone 36 corresponds to a range of free steering and forward control in which the automatic forward control may be retained so long as the forward command made by the operator is not less than the automatic acceleration command. This forward command is naturally transformed into the acceleration of the vehicle.

Inside zone 36 in a bend, the operator may continue to accelerate and the speed V of the vehicle tends to the speed VC compatible with the bend. The automatic control requires the operator to command an acceleration so as to avoid jeopardizing the vehicle.

If the operator continues to accelerate or keeps up his speed, or if the speed of the vehicle is equal to the speed compatible with the bend, the process no longer accelerates the vehicle and the bend is rounded normally.

If the operator looks too far to the right or left and the vehicle's speed is greater than that compatible with the bend, then rounding the bend is limited by the process so as not to jeopardize the vehicle whilst rounding the bend as widely as possible in the zone 35 to the nearest selected margin. Simultaneously, the automatic control commands the braking of the vehicle whilst respecting the kinematic data.

If the operator brakes when turning less than necessary, the automatic control ignores his command.

If the operator brakes and the vehicle's speed is less than the speed compatible with the bend, the steering control will be free so long as the operator's braking is greater than the automatic braking to take the braking into account without jeopardizing the vehicle.

For the steering of the vehicle, the range of control is adapted to the range in which the vehicle's behaviour when rounding a bend is presumed stable and where the control is able to compensate for the influence of gear changes during the bend. The resultant iso-settings correspond to:
  a low speed turn control,
  yaw speed control for moderate speeds, compensating for non-linearities during gear changes, and
  lateral acceleration control for high speeds, since the control organs the most commonly envisaged have low displacements.

The automatic control according to the invention will be activated when the steering command is incompatible with the current speed of the vehicle, with a margin of around 50%. The difference in margin between 50 and 60% of the maximal possible acceleration will be used to decelerate the vehicle with departing from the working range.

By way of a variant, control of 100% of the bend may be provided, with a margin at 60%. If the operator intentionally exceeds this control, he receives a physical feedback and the automatic control is triggered.

The vehicle can be advantageously observed not to skid. If a remote-control organ of low displacement is used, for example a cross-bar, the minimal radius of curvature able to be performed at the maximal displacement of the remote-control organ may be automatically allocated. Moreover, the automatic control is only triggered at a predetermined point in the parameterizable remote-control. By reducing the speed, the automatic control increases the number of road bends accessible by the maximal control. Thus, when the automatic control is triggered, the bend is naturally tighter.

The schema above clearly highlights the working ranges of the variant.

The cant and slope are taken into account by adjusting the kinematic data of the vehicle using the filtered yaw and pitch angles, measured by an inertial unit.

The invention claimed is:

1. An automatic slowing down system for a vehicle taking a bend, comprising:
  a computer that integrates a series of instructions to process at least one of first, second and third signals according to kinematic control laws of vehicle displacement to deliver signals for a forward motion actuator and a steering actuator;
  a forward control and a steering control that supply the first signal representative of a forward motion data and a steering data to the computer based on an operator's requirement;
  a linear speed sensor and a yaw speed sensor that supply the second signal to the computer; and
  a unit that supplies the third signal relating to road grip to the computer;
  a forward motion actuator and a steering actuator that respectively control forward motion and steering based on the at least one of the first, second and third signals processed by the computer.

2. An automatic slowing down method for a vehicle taking a bend, comprising:
  measuring forward motion V and yaw speed $\Omega$ of said vehicle;
  determining forward motion data and steering data required by an operator based on the forward motion V and the yaw speed $\Omega$ of said vehicle to infer a first working point;
  determining kinematic laws of the vehicle to infer a second working point; and
  according to the difference between the first and second working points, controlling a forward motion actuator and a steering actuator of said vehicle so as to slow down the vehicle.

3. The slowing down method according to claim 2, wherein data related to the road grip ($\mu$) is to be introduced.

4. The slowing down method according to claim 3, wherein the speed compatible (VC) with the bend is determined and compared with current speed (V) of the vehicle to limit forward motion speed control and to slow down the vehicle according to the difference between the first set working point and the second working point.

5. The slowing down method according to claim 2, wherein the speed compatible (VC) with the bend is determined and compared with current speed (V) of the vehicle to limit forward motion speed control and to slow down the vehicle according to the difference between the first set working point and the second working point.

6. The slowing down method according to claim 5, wherein the speed control is limited by a vehicle injection computer.

7. The slowing down process according to claim 6, wherein the speed control is limited by a vehicle's torque control.

8. The slowing down method according to claim 5, wherein the speed control is limited by a braking circuit pressure.

9. The slowing down method according to claim 8, wherein the speed control is limited by the vehicle's torque control.

10. The slowing down method according to claim 5, wherein the control desired by the operator is constantly compared to the control imposed by the computer to bring the measured value back to that supplied by the computer.

11. The slowing down method according to claim 5, wherein the vehicle's kinematics is integrated to make the vehicle safe by avoiding skidding and the driver's loss of control.

12. The slowing down method according to claim 5, wherein the vehicle's kinematics is integrated in the form of ellipse in a plane defined by Ax (longitudinal acceleration Ax) and Ay (lateral acceleration Ay) with which the working points are compared.

13. The slowing down method according to claim 2, wherein the steering control of the vehicle is limited.

14. The slowing down method according to claim 2, wherein the control desired by the operator is constantly compared to the control imposed by the computer to bring the measured value back to that supplied by the computer.

15. The slowing down method according to claim 14, wherein a deceleration strategy adapts the vehicle's speed on rounding a bend to the control desired by the driver to establish iso-settings corresponding to turn control for low speeds, yaw speed control for moderate speeds and lateral acceleration control for high speeds.

16. The slowing down method according to claim 2, wherein the vehicle's kinematics is integrated to make the vehicle safe by avoiding skidding and the driver's loss of control.

17. The slowing down method according to claim 2, wherein the vehicle's kinematics is integrated in the form of ellipse in a plane defined by Ax (longitudinal acceleration Ax) and Ay (lateral acceleration Ay) with which the working points are compared.

18. The slowing down method according to claim 17, wherein
- a working point inside a first internal ellipse permits a transmission of forward motion data and steering data to the actuators,
- a working point inside a second ellipse is corrected by a saturation of the forward motion data before transmission to the forward motion actuator, and
- a working point inside a third external ellipse is corrected by a saturation of the forward motion data and the steering data before transmission respectively to the forward motion and steering actuators.

19. The slowing down method according to claim 17, wherein the ellipses are included in a circle which radius is representative of the grip.

20. The slowing down method according to claim 17, wherein the ellipses are included in a circle which radius is representative of the grip.

* * * * *